US008755688B2

(12) United States Patent
Vleugels et al.

(10) Patent No.: US 8,755,688 B2
(45) Date of Patent: Jun. 17, 2014

(54) OPTICAL FIBRE NETWORKS

(75) Inventors: Ludwig Vleugels, Zichem (BE); Daniel Francois Daems, 'S Gravenwezel (BE); Danny Van Goidsenhoven, Boutersem (BE)

(73) Assignee: Tyco Electronics Raychem BVBA, Kessel-Lo (BE)

( * ) Notice: Subject to any disclaimer, the term of this patent is extended or adjusted under 35 U.S.C. 154(b) by 532 days.

(21) Appl. No.: 13/055,112

(22) PCT Filed: Jul. 17, 2009

(86) PCT No.: PCT/GB2009/050879
§ 371 (c)(1),
(2), (4) Date: Jan. 20, 2011

(87) PCT Pub. No.: WO2010/010378
PCT Pub. Date: Jan. 28, 2010

(65) Prior Publication Data
US 2011/0129226 A1 Jun. 2, 2011

(30) Foreign Application Priority Data
Jul. 21, 2008 (GB) .................................. 0813308.4

(51) Int. Cl.
*H04B 10/20* (2006.01)
(52) U.S. Cl.
USPC .................. 398/58; 398/61; 398/62; 398/66; 398/67; 398/98; 398/100; 398/101; 398/45
(58) Field of Classification Search
USPC ........................... 398/45, 58–67, 98, 100, 102
See application file for complete search history.

(56) References Cited

U.S. PATENT DOCUMENTS

| 5,432,875 | A | * | 7/1995 | Korkowski et al. ............. 385/27 |
| 5,546,483 | A | * | 8/1996 | Inoue et al. ...................... 385/14 |
| 6,396,573 | B1 | * | 5/2002 | Pimpinella .................. 356/73.1 |
| 6,577,422 | B1 | | 6/2003 | Frigo et al. |
| 2004/0165889 | A1 | | 8/2004 | Mahony et al. |
| 2006/0275036 | A1 | * | 12/2006 | Hochbaum et al. ............. 398/67 |

(Continued)

FOREIGN PATENT DOCUMENTS

WO WO 2006/130870 A1 12/2006

OTHER PUBLICATIONS

Search Report for priority Application No. GB0813308.4, issued by the UK Intellectual Property Office, dated Sep. 9, 2008; 1 page.

(Continued)

*Primary Examiner* — Li Liu
(74) *Attorney, Agent, or Firm* — Faegre Baker Daniels LLP

(57) ABSTRACT

An optical fiber transmission distribution assembly, wherein the assembly comprises at least a first splitter having a first split ratio of 1:x (where x is an integer) connected to optical drop cables leading to subscribers, and at least a second splitter having a second split ratio of 1:y (where y is an integer and is different from x), and transfer means whereby an optical drop cable connected to the first splitter can be transferred to receive split optical signals from the second splitter, thereby enabling the signal in the transferred drop cable to be further split by addition of a third splitter at a ratio of 1:p (where p is an integer), to provide p subscriber connection points each having a 1:p*y split ratio at the subscriber end of the transferred drop cable.

18 Claims, 3 Drawing Sheets

(56) References Cited

U.S. PATENT DOCUMENTS

Figure 1:
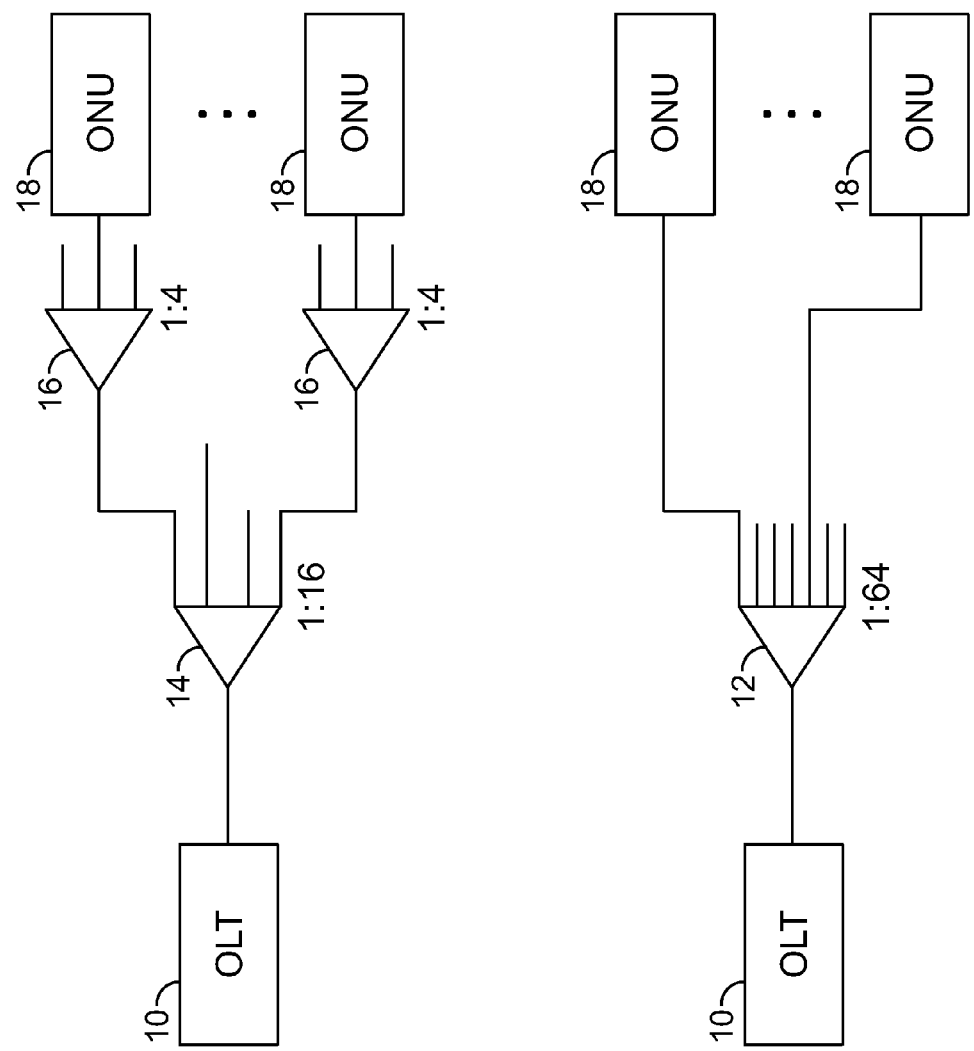

2006/0275038 A1* 12/2006 Walton et al. .................... 398/71
2007/0133923 A1* 6/2007 Park et al. ........................ 385/14
2008/0031624 A1 2/2008 Smith et al.

OTHER PUBLICATIONS

International Preliminary Report on Patentability issued by the International Bureau of WIPO on Jan. 25, 2011 for PCT/GB2009/050879; 7 pages.

Roskes, S. et al., "Costs per Home *Connected*: The Impacts of Automated Fiber Management on Fiber-to-the Home Deployments", Optical Fiber Communication/National Fiber Optic Engineers Conference, 2008. Conference on, IEEE, Piscataway, NJ, Feb. 24, 2008, pp. 1014-1017.

Fiberzone Networks, "White Paper: The Impact of Automated Fiber Management on FTTH Deployment and Operations" Jul. 2008. Retrieved from the Internet: URL:http://www.ospma.com/files/pdf/whitepaper/White_Paper/FTTH/Impacts/July_08. pdf>, retrieved on Oct. 27, 2009, 8 pp.

International Search Report and Written Opinion for PCT/GB2009/050879 issued by the European Patent Office on Nov. 9, 2009.

\* cited by examiner

OPTICAL FIBRE NETWORKS

This invention relates to optical fibre access networks, e.g. Fibre to the Curb (FTTC), Fibre to the Premise (FTTP), Fibre to the Building (FTTB), in which the optical signal from a main optical line termination (OLT) is subdivided by one or more optical splitters to provide a signal split ratio of e.g 1:32, 1:64, 1:128 or any other split ratio, at the home or other subscriber end, the selected split ratio, for example 1:64, giving the necessary subscriber signal power for which the system is designed. Any split ratio, not necessarily based on integer powers of 2, may be used. A split ratio of 1:64 is currently preferred and will be described for convenience hereinafter, without limiting the broad scope of this invention to any particular split ratio.

The preferred 1:64 signal split ratio may be achieved by a single 1:64 centralised splitter from which 64 single fibres each carrying $1/64^{th}$ of the main signal go respectively to individual subscribers. Alternatively, a distributed splitter network may be used having a first splitter of lower split ratio, say 1:32 or 1:16, feeding to one or two more splitters of low ratio, say 1:2 or 1:4, positioned further towards the subscriber end, of the network, thus delivering the necessary 1:64 split ratio to the subscribers.

These known centralised and distributed splitter systems have the disadvantage that testing of individual subscriber lines using common optical time delay reflectometer (OTDR) methods may be unreliable or unworkable due to difficulty in distinguishing test signal reflections from all the branches of the optical fibre network. Another disadvantage arises when it is desired to add a new subscriber, but all of the original 64 subscriber connections are already occupied, for example in a multi-dwelling unit (MDU). It can be undesirably expensive to add an extra line by installing an extra main cable from the central office to the outside distribution hub, installing an extra splitter in the hub, installing an extra drop cable to the home or other subscriber, and connecting the new drop cable to the subscriber's equipment, since this involves separate visits ("truck rolls") from the differently equipped cable team, drop connection team, and subscriber connection technician. Also, too many of the additional subscriber connections provided in this way may be redundant and not cost efficient when only one or a few extra connections are actually needed.

The present invention addresses the aforementioned disadvantages by providing an optical fibre transmission distribution assembly with remotely controllable optical signal split ratio management. The invention accordingly provides an optical fibre transmission distribution assembly,
wherein the assembly comprises at least a first splitter having a first split ratio of 1:x (where x is an integer) connected to optical drop cables leading to subscribers, and
at least a second splitter having a second split ratio of 1:y (where y is an integer and is different from x), and transfer means whereby an optical drop cable connected to the first splitter can be transferred to receive split optical signals from the second splitter, thereby enabling the signal in the transferred drop cable to be further split by addition of a third splitter at a ratio of 1:p (where p is an integer), to provide p subscriber connection points each having a 1:p*y split ratio at the subscriber end of the transferred drop cable.

With currently available control and test methods and equipment, it is preferred that x is larger than y, so that the number of split-signal cables connectable to a proximal first splitter (closer to the control office) is greater than the number of subscriber drop cables connectable to a remote second splitter. However, it will be appreciated that y could be larger than x, so that a remote second splitter is connectable to more cables than a proximal first splitter.

Preferred aspects of the invention may provide an optical fibre transmission distribution assembly, wherein the assembly comprises at least one automatic fibre management unit (AFM) connectable to direct split optical signals received from a first splitter at a first split ratio 1:x in use (where x is an integer and is at least 2, preferably 4 to 100, more preferably 8 to 64) to optical drop cables leading to subscribers, and wherein the said management unit is remotely controllable to transfer a selected drop cable connection to receive split optical signals from a second splitter having a second split ratio 1:y (where y is an integer and is less than x), thereby enabling the signal in the transferred drop cable to be further split by addition of a third splitter at a ratio of 1:p (where p is an integer and p multiplied by y equals x), to provide p subscriber connection points each having a 1:x split ratio at the subscriber end of the transferred drop cable. Preferably the assembly is designed for installation at a location remote from a controlling central location, for example to provide an outside plant optical fibre distribution hub (FDH) or cabinet.

It may be preferable that the assembly according to this invention comprises (a) at least a first optical splitter connectable to a first main optical fibre to split an optical signal carried by that first main fibre in operation to a split ratio of $1:2^n$ where n is an integer from 2 to 8 (preferably from 4 to 6), (b) at least a second optical splitter connectable to a second main optical fibre to split an optical signal carried by that second main fibre in operation to a split ratio of $1:2^m$ where m is an integer at least one lower than n (preferably m=1, 2, or 3), and
(c) at least one automatic fibre management unit (AFM) connectable to direct the split optical signals received from the said splitters in use to optical drop cables leading to subscribers, wherein the said management unit is remotely controllable to transfer a selected optical drop cable connection from the first optical splitter to the second optical splitter, thereby enabling the transferred drop cable signal to be further split to a ratio of 1:p where p is 2, 4, 6, 8 or 16 and p multiplied by $2^m$ equals $2^n$, so enabling a $1:2^n$ (preferably 1:64) split signal to be supplied to p−1 new subscriber connections on the transferred drop cable.

In preferred embodiments of this invention, the assembly may include an enclosure in which the said splitters and automatic fibre management unit are installable or already pre-installed to form a fibre distribution hub or cabinet. This assembly may be installed as an outside plant fibre distribution hub or cabinet remote from a central office in an optical fibre communications network. The assembly of this invention may be installed above ground, for example as a roadside cabinet, or in underground enclosures of any convenient kind.

It is currently preferred that the said first optical splitter splits the signal to a ratio of 1:64, and the said second optical splitter splits the signal to a ratio of 1:32 or 1:16, so that the drop cable connection transferred to the said second splitter by the said management unit in operation can be further split to a ratio of 1:2 or 1:4 respectively.

In addition to the remote split-ratio-controlling function of the said management unit, it may be useful to design the management unit to be remotely controllable to connect a selected drop cable to a test circuit by-passing the said first and second splitters, thereby enabling testing of the selected drop cable as a single optical circuit independently of the other drop cables. It may similarly be useful to provide that the said management unit is designed to be remotely controllable to connect one of the said main optical fibres to a test circuit by-passing the said splitters, thereby enabling testing of the selected main optical fibre as a single optical circuit independently of the other main optical fibre(s). Preferably these remote controlling and testing functions will be performed by suitable switching and test equipment, located in a central office of the network. The currently preferred test equipment includes known OTDR equipment and methods.

Suitable splitters for inclusion in the assembly according to the invention are known in themselves, or can readily be devised by persons skilled in this technology using known components. Suitable AFMs may be designed by persons familiar with the technology, or may be selected from known Fibre Optic Cross-Connection Systems (FOCS), for example DiamondWave™ FiberConnect FOCS available from Calient™ Networks Inc. Known methods and equipment may be used for optically connecting the main optical fibre to the first splitter, and for optically connecting the first and second splitters to the AFM, and for optically connecting the optical drop cables to the AFM, in the assembly according to this invention.

The invention will now be described in more detail by way of example with reference to the accompanying drawings, wherein:—

Figure 2:
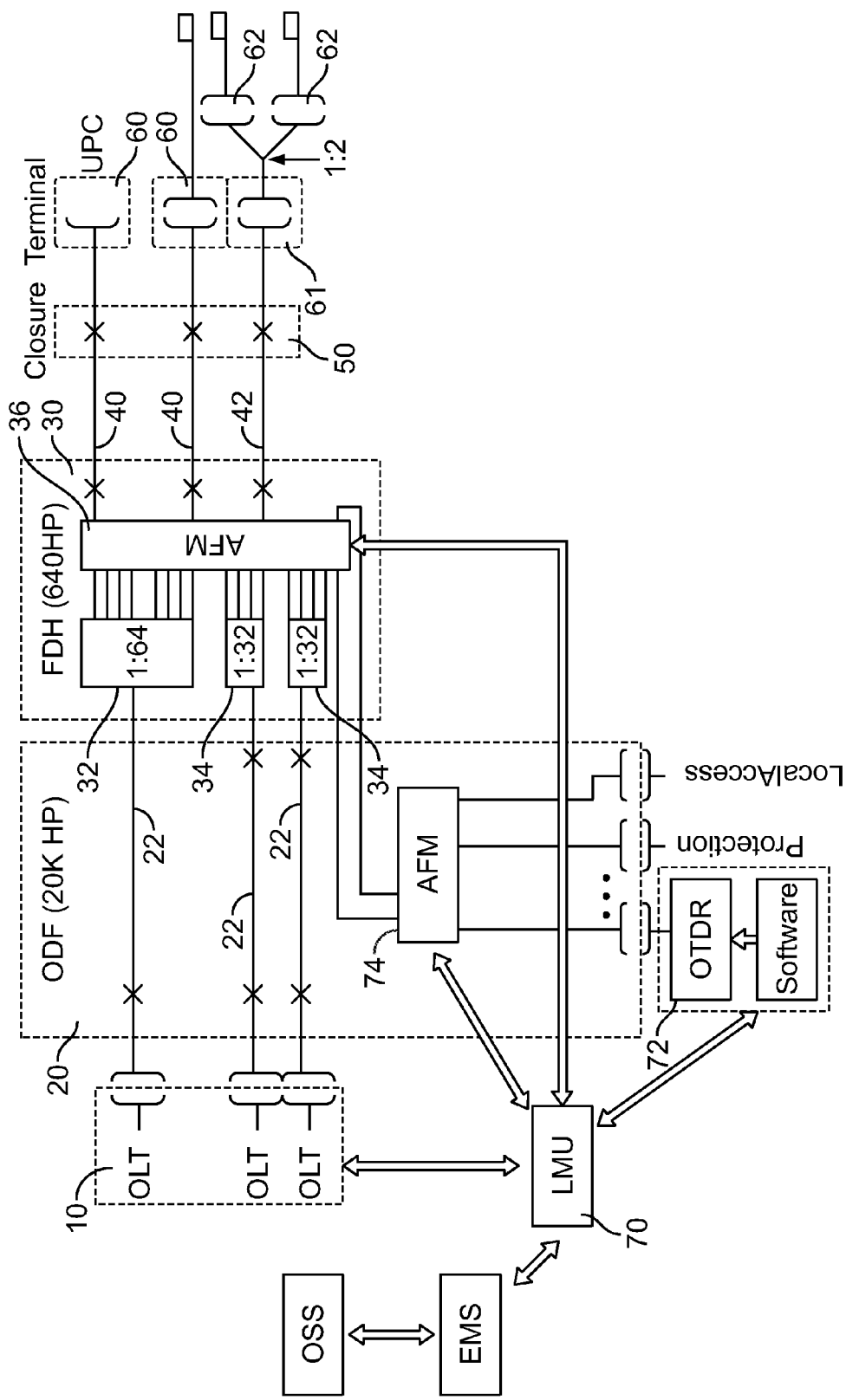
Figure 3:
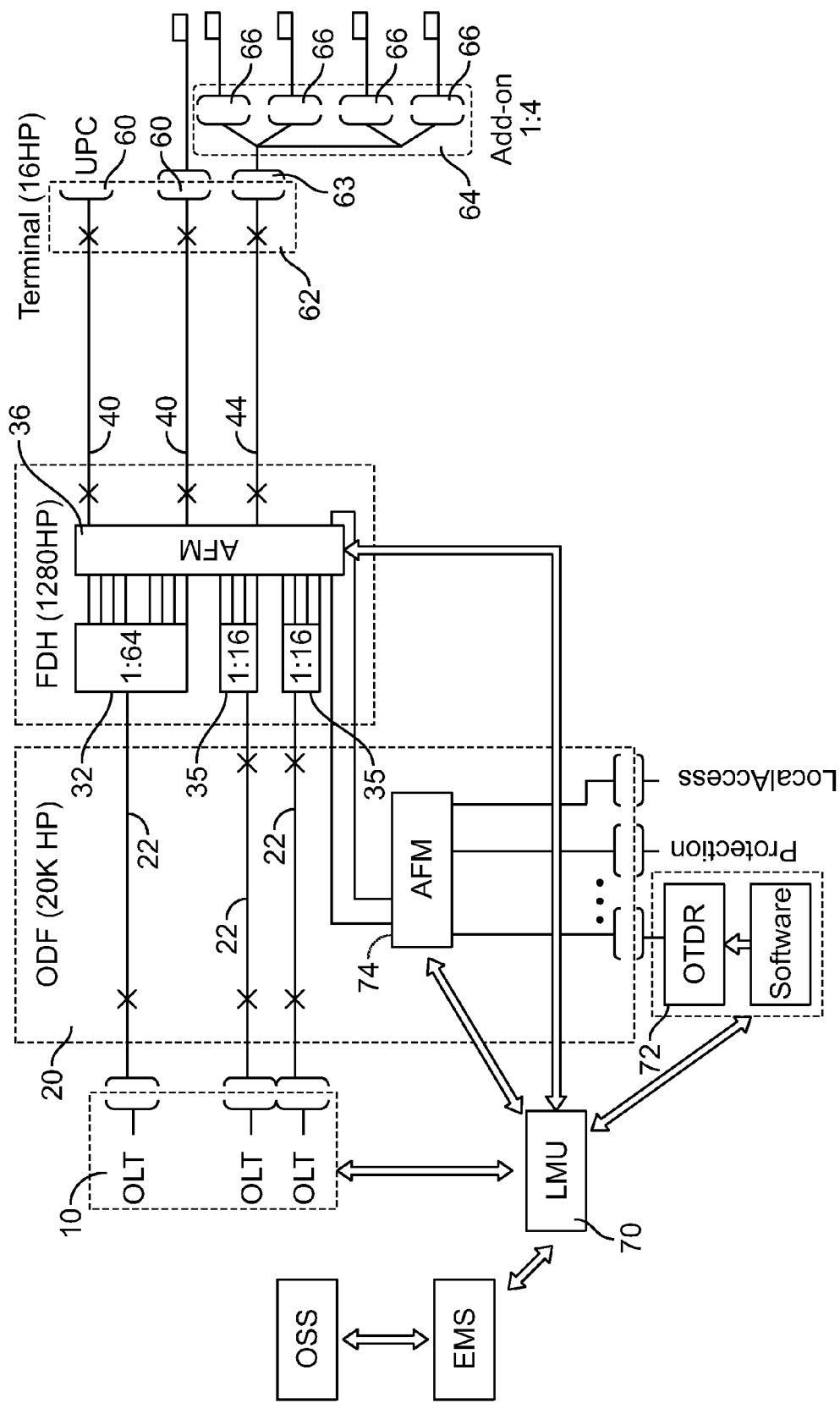

FIG. 1 shows in self-explanatory diagram form the known Distributed Split and Centralised Split arrangements;

FIG. 2 shows in block diagram an optical fibre telecommunications system for single dwellings (single family units) including the assembly for remotely controlling the optical signal split ratios according to the present invention; and FIG. 3 shows in block diagram an optical fibre telecommunications system for multiple dwellings (blocks of flats/apartments) including the assembly for remotely controlling the optical signal split ratios according to the present invention.

In the known systems shown in FIG. 1, a main Optical Line Termination (OLT) 10 is respectively connected either to a 1:64 centralised splitter 12, or to a 1:16 splitter 14 from which the split signals pass to distributed 1:4 splitters 16, each of these arrangements thus delivering a standard 1:64 split signal to the subscriber equipment or other Optical Network Units (ONU) 18.

In the single (family) unit system shown in FIG. 2, the main Optical Line Terminations (OLT) 10 are optically connected via the usual central office Optical Distribution Frame (ODF) 20 and cables 22 to a remote Fibre Distribution Hub or cabinet (FDH) 30 according to this invention enclosing a 1:64 first optical splitter 32 and two 1:32 second optical splitters 34 and an Automatic Fibre Management unit (AFM) 36. The split optical signals from the respective 1:64 first splitter 32 and 1:32 second splitters 34 are conducted to the Automatic Fibre Management unit (AFM) 36, from which drop fibres 40 carry the 1:64 split signal via a closed junction box 50 of known kind to respective subscriber terminals 60. Drop cable 42 has been transferred by the AFM 36 according to this invention from its original connection on the 1:64 first splitter 32 to one of the 1:32 second splitters 34, so that drop cable 42 carries a 1:32 split signal that is bifurcated by insertion of a 1:2 third splitter near the subscriber terminal 61 to deliver a standard 1:64 split signal to two subscriber terminals 62 on that single drop cable 42.

FIG. 3 shows the application of the present invention to Multi-Dwelling Units (MDU). As in FIG. 2, the main Optical Line Terminations (OLT) 10 are optically connected via the usual central office Optical Distribution Frame (ODF) 20 and cables 22 to a remote Fibre Distribution Hub or cabinet (FDH) 30 according to this invention enclosing a 1:64 first optical splitter 32 and an Automatic Fibre Management unit (AFM) 36, but replacing the two 1:32 second optical splitters of FIG. 2 with two 1:16 second optical splitters 35. The split optical signals from the respective 1:64 first splitter 32 and 1:16 second splitters 35 are conducted to the Automatic Fibre Management unit (AFM) 36, from which drop fibres 40 carry the 1:64 split signal via an MDU distribution terminal 62 of known kind to respective subscriber terminals 60. Drop cable 44 has been transferred by the AFM 36 according to this invention from its original connection on the 1:64 first splitter 32 to one of the 1:16 second splitters 35, so that drop cable 44 carries a 1:16 split signal that is split by insertion of a 1:4 third splitter 64 near the subscriber terminal 63 to deliver a standard 1:64 split signal to four subscriber terminals 66 on that single drop cable 44.

It will be understood that the 1:32 second splitter and 1:2 third splitter illustrated for single family units in FIG. 2 could also be used in multiple dwelling units or other situations, and that the 1:16 second splitter and 1:4 third splitter illustrated for multiple dwelling units in FIG. 3 could also be used in single family units and other situations.

Both FIGS. 2 and 3 show schematically a Local Management Unit (LMU) 70 and other items (OSS, EMU not requiring description for the present purposes) together with OTDR test equipment and software 72, usually located in the central office. A second AFM unit 74 is provided to be remotely controllable by the LMU 70 together with the first AFM unit 36 to bypass the splitters 32, 34, 35 and to switch any selected drop cable, or any selected main cable 22 and OLT 10, to the OTDR test equipment 72 for testing as a single cable, thus avoiding the confusing optical reflections from the various branches of the system that result from direct testing of branched optical systems through the splitters.

This invention includes a fibre distribution hub (FDH) or cabinet with the splitters and AFM pre-installed therein, with or without pre-installed portions of the main cables or drop cables.

The invention claimed is:

1. An optical fibre transmission distribution assembly, wherein the assembly comprises:
    at least a first splitter having a first split ratio of 1:x (where x is an integer) connected to optical drop cables leading to subscribers,
    at least a second splitter having a second split ratio of 1:y (where y is an integer and is different from x), and
    transfer means whereby an optical drop cable connected to the first splitter can be transferred to receive split optical signals from the second splitter, wherein the transfer means comprises at least one automatic fibre management unit (AFM) connectable to direct split optical signals received from the first splitter at a first split ratio 1:x in use (where x is an integer and is at least 2) to optical drop cables leading to subscribers, and wherein the said management unit is remotely controllable to transfer a selected drop cable connection to receive split optical signals from the second splitter having a second split ratio 1:y (where y is an integer and is less than x),
    thereby enabling the signal in the transferred drop cable to be further split by addition of a third splitter at a ratio of 1:p (where p is an integer and p multiplied by y equals x), to provide p subscriber connection points each having 1:x split ratio at the subscriber end of the transferred drop cable.

2. An assembly according to claim 1 for installation at a location remote from a controlling central location, the assembly comprising (a) at least the first optical splitter connectable to a first main optical fibre to split an optical signal carried by that first main fibre in operation to a split ratio of $1:2^n$ where n is an integer from 2 to 8, (b) at least the second optical splitter connectable to a second main optical fibre to split an optical signal carried by that second main fibre in operation to a split ratio of $1:2^m$ where m is an integer at least one lower than n, and (c) the at least one automatic fibre management unit connectable to direct the split optical signals received from the said splitters in use to optical drop cables leading to subscribers, wherein the said management unit is remotely controllable to transfer a selected optical drop cable connection from the first optical splitter to the second optical splitter, thereby enabling the transferred drop cable to be further split by attachment thereto of a third optical splitter to a ratio of $1:p$ where p is 2, 4, 6, 8 or 16 and p multiplied by $2^m$ equals $2^n$, so enabling a $1:2^n$ split signal to be supplied to p−1 new subscriber connections on the transferred drop cable.

3. An assembly according to claim 2, wherein x is between 4 and 6.

4. An assembly according to claim 2, wherein the $1:2^n$ ratio split signal is 1:64.

5. An assembly according to claim 1, including an enclosure in which the said first and second splitters and the said transfer means are installable or already pre-installed to form a fibre distribution hub or cabinet.

6. An assembly according to claim 5, having the first and second splitters installed in the enclosure and having a first optical cable connected to the first splitter and a second optical cable connected to the second splitter.

7. An assembly according to claim 5, installed as an outside plant fibre distribution hub or cabinet remote from a central office in an optical fibre communications network.

8. An assembly according to claim 1, wherein the said first optical splitter splits the signal to a ratio of 1:64, and the said second optical splitter splits the signal to a ratio of 1:32 or 1:16, so that the drop cable connection transferred to the said second splitter by the said transfer means in operation can be further split to a ratio of 1:2 or 1:4 respectively.

9. An assembly according to claim 1, wherein the said transfer means is also remotely controllable to connect a selected drop cable to a test circuit by-passing the said first and second splitters, thereby enabling testing of the selected drop cable as a single optical circuit independently of the other drop cables.

10. An assembly according to claim 9, wherein the said test circuit is connected to test equipment located in a central office of an optical fibre transmission distribution network.

11. An assembly according to claim 1, wherein one or more main optical fibres is/are connected to each of the said splitters and the said transfer means is remotely controllable to connect a selected one of the said main optical fibres to a test circuit by-passing the said splitters, thereby enabling testing of the selected main optical fibre as a single optical circuit independently of the other main optical fibre(s).

12. An assembly according to claim 1, wherein x is between 4 and 256.

13. An assembly according to claim 12, wherein x is between 8 and 128.

14. An assembly according to claim 13, wherein x is between 16 and 64.

15. An optical fibre transmission distribution assembly for installation at a location remote from a controlling central location, wherein the assembly comprises:

at least a first optical splitter having a first split ratio of 1:x (where x is an integer) connected to optical drop cables leading to subscribers, the first optical splitter connectable to a first main optical fibre to split an optical signal carried by that first main fibre in operation to a split ratio of $1:2^n$ where n is an integer from 2 to 8, at least a second optical splitter having a second split ratio of 1:y (where y is an integer and is different from x), the second optical splitter connectable to a second main optical fibre to split an optical signal carried by that second main fibre in operation to a split ratio of $1:2^m$ where m is an integer at least one lower than n, transfer means whereby an optical drop cable connected to the first splitter can be transferred to receive split optical signals from the second splitter, and at least one automatic fibre management unit connectable to direct the split optical signals received from the said splitters in use to optical drop cables leading to subscribers, wherein the said management unit is remotely controllable to transfer a selected optical drop cable connection from the first optical splitter to the second optical splitter, thereby enabling the transferred drop cable to be further split by attachment thereto of a third optical splitter to a ratio of $1:p$ where p is 2, 4, 6, 8 or 16 and p multiplied by $2^m$ equals $2^n$, so enabling a $1:2^n$ split signal to be supplied to p−1 new subscriber connections on the transferred drop cable.

16. An assembly according to claim 15, wherein the at least one automatic fibre management unit (AFM) is connectable to direct split optical signals received from the first splitter at a first split ratio 1:x in use (where x is an integer and is at least 2) to optical drop cables leading to subscribers, and wherein the said management unit is remotely controllable to transfer a selected drop cable connection to receive split optical signals from the second splitter having a second split ratio 1:y (where y is an integer and is less than x), thereby enabling the signal in the transferred drop cable to be further split by addition of a third splitter at a ratio of 1:p (where p is an integer and p multiplied by y equals x), to provide p subscriber connection points each having a 1:x split ratio at the subscriber end of the transferred drop cable.

17. An assembly according to claim 15, wherein x is between 4 and 6.

18. An assembly according to claim 15, wherein the $1:2^n$ ratio split signal is 1:64.

\* \* \* \* \*